(12) United States Patent
Wu et al.

(10) Patent No.: US 11,264,822 B2
(45) Date of Patent: Mar. 1, 2022

(54) METHOD FOR DETERMINING CHARGER, RELATED DEVICE, AND SYSTEM

(71) Applicant: Huawei Technologies Co., Ltd., Shenzhen (CN)

(72) Inventors: Jinming Wu, Shenzhen (CN); Peng Ding, Shanghai (CN); Yajun Pan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 16/464,412

(22) PCT Filed: Mar. 23, 2017

(86) PCT No.: PCT/CN2017/077876
§ 371 (c)(1),
(2) Date: May 28, 2019

(87) PCT Pub. No.: WO2018/098942
PCT Pub. Date: Jun. 7, 2018

(65) Prior Publication Data
US 2019/0363560 A1   Nov. 28, 2019

(30) Foreign Application Priority Data
Nov. 29, 2016 (CN) .......................... 201611070382.0

(51) Int. Cl.
*H02J 7/00* (2006.01)
(52) U.S. Cl.
CPC ......... *H02J 7/0072* (2013.01); *H02J 2207/40* (2020.01)
(58) Field of Classification Search
CPC .......................... H02J 7/00047; H02J 7/00045
(Continued)

(56) References Cited

U.S. PATENT DOCUMENTS 8,344,928 B2   1/2013   Guedon et al.
9,030,157 B2   5/2015   Ting
(Continued)

FOREIGN PATENT DOCUMENTS

CN     1574541 A    2/2005
CN   102393837 A    3/2012
(Continued)

OTHER PUBLICATIONS

Machine Translation and Abstract of Chinese Publication No. CN104539001, Apr. 22, 2015, 8 pages.
(Continued)

*Primary Examiner* — Samuel Berhanu
(74) *Attorney, Agent, or Firm* — Conley Rose, P.C.

(57) ABSTRACT

This application provides a method for determining a charger, a related device, and a system. The method includes: detecting, by an electronic device, a charging current output from a charger; when amplitude values of the charging current are a sequence of variable current, quantifying the current sequence into a binary sequence; determining whether the quantified binary sequence is the same as a prestored binary sequence; and when the quantified binary sequence is different from the prestored binary sequence, outputting prompt information indicating that the charger is a non-standard configuration charger. According to the present invention, whether the charger is a standard configuration charger is determined. This manner is simple and convenient. In addition, no specific device detection module needs to be disposed on the charger.

20 Claims, 4 Drawing Sheets

(58) Field of Classification Search
USPC .......................................................... 320/106
See application file for complete search history.

(56) References Cited

U.S. PATENT DOCUMENTS

| | | | |
|---|---|---|---|
| 2007/0108938 A1 | 5/2007 | Veselic | |
| 2008/0019234 A1 | 1/2008 | Shiono | |
| 2008/0129252 A1* | 6/2008 | Nishino | H02J 7/0071 320/162 |
| 2012/0025752 A1* | 2/2012 | Teggatz | H02J 7/35 320/101 |
| 2013/0082644 A1 | 4/2013 | Gagne et al. | |
| 2014/0103864 A1 | 4/2014 | Song | |

FOREIGN PATENT DOCUMENTS

| | | |
|---|---|---|
| CN | 102938572 A | 2/2013 |
| CN | 103280899 A | 9/2013 |
| CN | 103295284 A | 9/2013 |
| CN | 103390929 A | 11/2013 |
| CN | 103972955 A | 8/2014 |
| CN | 102439816 B | 1/2015 |
| CN | 104539001 A | 4/2015 |
| CN | 104836277 A | 8/2015 |
| CN | 103633709 B | 10/2015 |
| CN | 104993527 A | 10/2015 |
| CN | 105743163 A | 7/2016 |
| EP | 1487081 B1 | 3/2009 |
| TW | I42358 B | 10/2005 |

OTHER PUBLICATIONS

Foreign Communication From a Counterpart Application, European Application No. 17875902.3, Extended European Search Report dated Sep. 17, 2019, 6 pages.
Machine Translation and Abstract of Chinese Publication No. CN103633709, Mar. 12, 2014, 16 pages.
Machine Translation and Abstract of Chinese Publication No. CN102393837, Mar. 28, 2012, 30 pages.
Machine Translation and Abstract of Chinese Publication No. CN102938572, Feb. 20, 2013, 11 pages.
Machine Translation and Abstract of Chinese Publication No. CN103390929, Nov. 13, 2013, 27 pages.
Machine Translation and Abstract of Chinese Publication No. CN105743163, Jul. 6, 2016, 12 pages.
Foreign Communication From a Counterpart Application, PCT Application No. PCT/CN2017/077876, English Translation of International Search Report dated Jul. 11, 2017, 2 pages.
Foreign Communication From a Counterpart Application, PCT Application No. PCT/CN2017/077876, English Translation of Written Opinion dated Jul. 11, 2017, 4 pages.

* cited by examiner

METHOD FOR DETERMINING CHARGER, RELATED DEVICE, AND SYSTEM

CROSS-REFERENCE TO RELATED APPLICATIONS

This application is a U.S. National Stage of International Patent Application No. PCT/CN2017/077876 filed on Mar. 23, 2017, which claims priority to Chinese Patent Application No. 201611070382.0 filed on Nov. 29, 2016. Both of the aforementioned applications are hereby incorporated by reference in their entireties.

TECHNICAL FIELD

This application relates to the field of detection technologies, and specifically, to a method for determining a charger, a related device, and a system.

BACKGROUND

Before each electronic device (for example, a mobile phone) is sold, a standard configuration charger is usually configured for the electronic device. The standard configuration charger is used to charge the corresponding electronic device, to ensure a service life of the standard configuration charger and a service life of the corresponding electronic device to a greatest extent.

With innovation of various electronic devices, a quantity of types of terminals owned by each family is growing, and correspondingly an quantity of chargers is increasing. As a result, a possibility of abusing the chargers is increasing. To avoid harm caused by charger abuse, an identity of a charger needs to be identified.

An existing electronic device cannot determine whether a connected charger is a standard configuration charger yet.

SUMMARY

This application provides a method for determining a charger, a related device, and a system, to determine whether a charger is a standard configuration charger.

According to a first aspect, the present invention provides a method for determining a charger. The method is applied to an electronic device, and the method includes:

detecting a charging current output from the charger;

when amplitude values of the charging current are a sequence of variable current, quantifying the current sequence into a binary sequence;

determining whether the quantified binary sequence is the same as a prestored binary sequence; and when the quantified binary sequence is different from the prestored binary sequence, outputting prompt information indicating that the charger is a non-standard configuration charger.

In a first possible implementation of the first aspect, the method further includes:

outputting an instruction signal, where the instruction signal is used to instruct the charger to output a charging current based on preset amplitude values that are a sequence of variable current.

With reference to the first possible implementation of the first aspect, in a second possible implementation, the outputting an instruction signal includes:

adjusting a load value of a charging circuit to a preset value.

With reference to the first aspect, the first possible implementation of the first aspect, or the second possible implementation of the first aspect, in a third possible implementation, the method further includes:

when the prompt information is output, receiving the charging current output from the charger.

With reference to the first aspect, the first possible implementation of the first aspect, or the second possible implementation of the first aspect, in a fourth possible implementation, the detecting a charging current output from the charger includes:

detecting, by using a VBUS interface connected to the charger, the charging current output from the charger.

According to a second aspect, the present invention provides a method for determining a charger. The method is applied to a charger, and the method includes:

detecting a preset change condition of a current output manner; and outputting a charging current based on a preset current sequence with variable amplitude values, so that the electronic device quantifies the current sequence into a binary sequence; determining whether the quantified binary sequence is the same as a prestored binary sequence; and determining, based on a result of determining, whether the charger is a standard configuration charger of the electronic device.

In a first possible implementation of the second aspect, the preconfigured change condition is:

a load value of a charging circuit of the electronic device is a preset value; or a preset moment after the charger and the electronic device form a charge loop.

According to a third aspect, an electronic device is provided. The electronic device includes units configured to perform the method in the first aspect or any possible implementation of the first aspect.

According to a fourth aspect, an electronic device is provided. The electronic device includes a processor, a memory, and a bus system. The processor and the memory are connected by using the system bus. The memory is configured to store one or more programs, the one or more programs include an instruction, and when the instruction is executed by the electronic device, the electronic device performs the method in the first aspect or any possible implementation of the first aspect.

According to a fifth aspect, a computer readable storage medium storing one or more programs is provided. When the one or more programs are executed by the electronic device, the electronic device performs the method in the first aspect or any possible implementation of the first aspect.

According to a sixth aspect, a graphical user interface on an electronic device is provided. The electronic device includes a display, a memory, a plurality of application programs, and one or more processors configured to execute one or more programs stored in the memory. The graphical user interface includes a user interface displayed according to the method in the first aspect or any possible implementation of the first aspect. The display includes a touch-sensitive surface and a display screen.

According to a seventh aspect, a charger is provided. The charger includes units configured to perform the method in the second aspect or any possible implementation of the second aspect.

According to an eighth aspect, a charger is provided. The charger includes a processor, a memory, and a bus system. The processor and the memory are connected by using the system bus. The memory is configured to store one or more programs, the one or more programs include an instruction, and when the instruction is executed by the charger, the charger performs the method in the second aspect or any possible implementation of the second aspect.

According to a ninth aspect, a computer readable storage medium storing one or more programs is provided. When the one or more programs are executed by the charger, the charger performs the method in the second aspect or any possible implementation of the second aspect.

According to a tenth aspect, a graphical user interface on a charger is provided. The charger includes a display, a memory, a plurality of application programs, and one or more processors configured to execute one or more programs stored in the memory. The graphical user interface includes a user interface displayed according to the method in the second aspect or any possible implementation of the second aspect. The display includes a touch-sensitive surface and a display screen.

According to an eleventh aspect, the present invention provides a system for determining a charger. The system includes the electronic device provided in the third aspect or the fourth aspect and the charger provided in the seventh aspect or the eighth aspect.

It can be learned from the technical solutions that this application has the following advantages:

After the electronic device and the charger form the charge loop, the electronic device detects the charging current output from the charger; when the amplitude values of the charging current are the sequence of variable current, quantifies the current sequence into the binary sequence; determines whether the quantified binary sequence is the same as the prestored binary sequence; and when the quantified binary sequence is different from the prestored binary sequence, outputs the prompt information indicating that the charger is the non-standard configuration charger. In this application, a currently-used charger only needs to output a current based on a preset current sequence with variable amplitude values. Provided that a binary sequence corresponding to the current sequence is the same as a binary sequence that corresponds to the standard configuration charger and that is stored in the electronic device, the electronic device determines that the currently-used charger is the standard configuration charger of the electronic device; otherwise, the currently-used charger is the non-standard configuration charger. It can be learned that this application is used to determine whether a currently-used charger is a standard configuration charger.

DESCRIPTION OF EMBODIMENTS

The following describes the embodiments of this application with reference to accompanying drawings.

Figure 1:
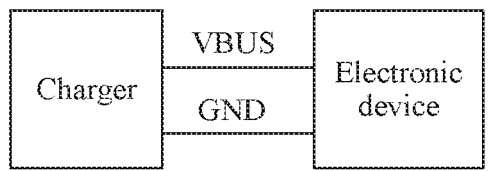
FIG. 1 is a schematic diagram of a connection between a charger and an electronic device according to an embodiment of this application.

An embodiment of this application provides a method for determining a charger. FIG. 1 is a schematic diagram of a connection between an electronic device and the charger for implementing the method according to the embodiment of this application. The electronic device is a terminal device with a battery. The charger is connected to the electronic device through charge interfaces VBUS and GND, to form a charge loop, so that the charger charges the electronic device. It should be understood that a type of the electronic device is not limited in this embodiment of this application. The electronic device may be a device that can use a charger for charging such as a smartphone, a portable computer, a tablet computer, a smartwatch, an electronic band, or a wearable device.

The method provided in this embodiment of this application is based on a simple charger feedback output manner, so that the electronic device identifies an identity of a charger. Specifically, an electronic device corresponding to a standard configuration charger prestores, inside the electronic device, a specific current output manner of the standard configuration charger of the electronic device. In an actual application, after the electronic device and the charger form a charge loop by using the charge interfaces VBUS and GND, the charger outputs a charging current in a preset current output manner at a moment or under a trigger condition. After detecting the current output manner, the electronic device compares the current output manner with the stored current output manner. After the comparison, if the current output manner of the charger is the same as the current output manner stored in the electronic device, it is considered that the charger is a standard configuration charger of the electronic device; otherwise, it is considered that the charger is a non-standard configuration charger of the electronic device.

Figure 2:
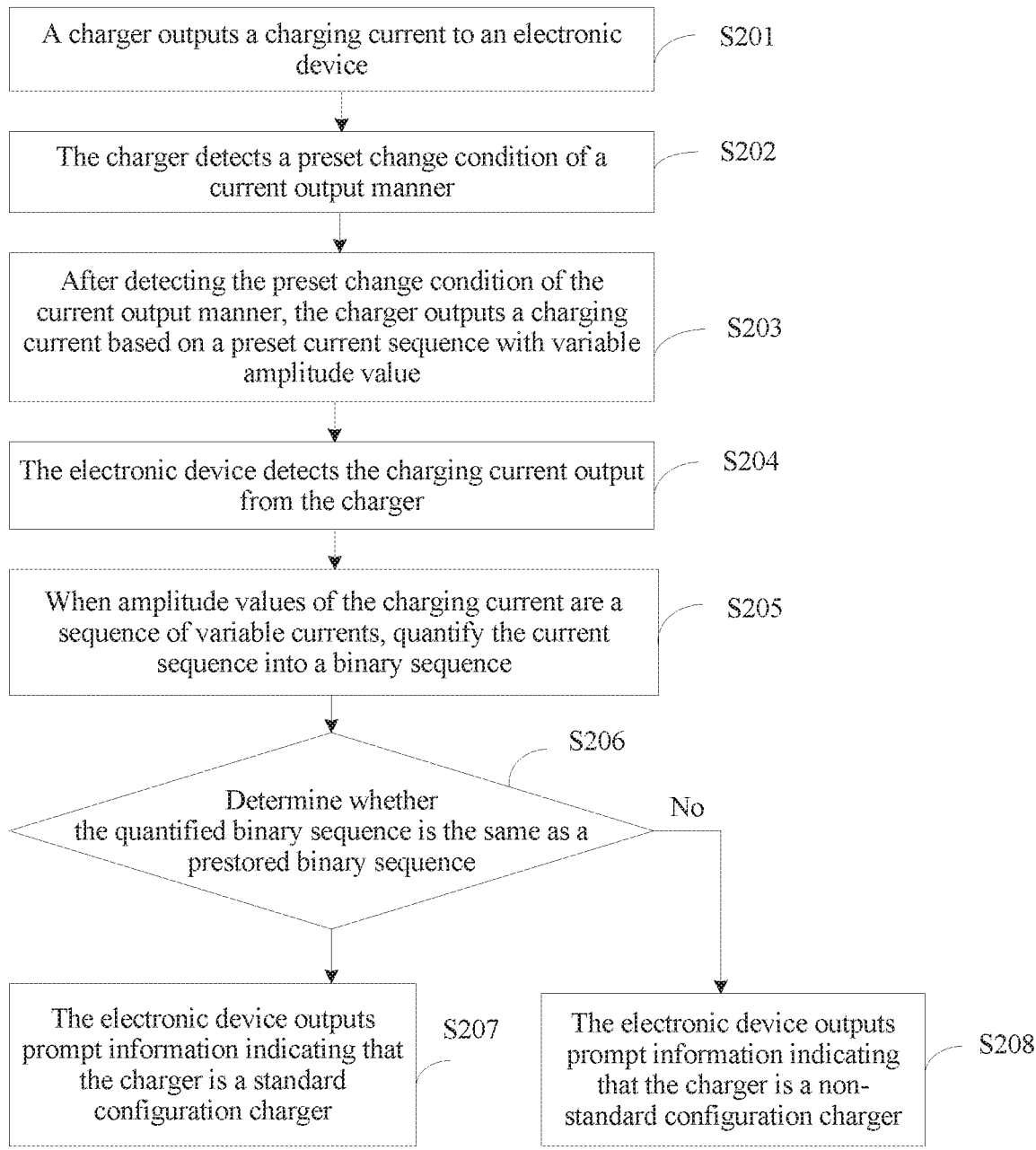
FIG. 2 is a schematic flowchart of a method for determining a charger according to an embodiment of this application.

FIG. 2 is a schematic flowchart of a method for determining a charger according to an embodiment of this application.

S201. A charger outputs a charging current to an electronic device.

After the charger and the electronic device form a charge loop by using charge interfaces VBUS and GND, the charger supplies the charging current to the electronic device.

Figure 3:
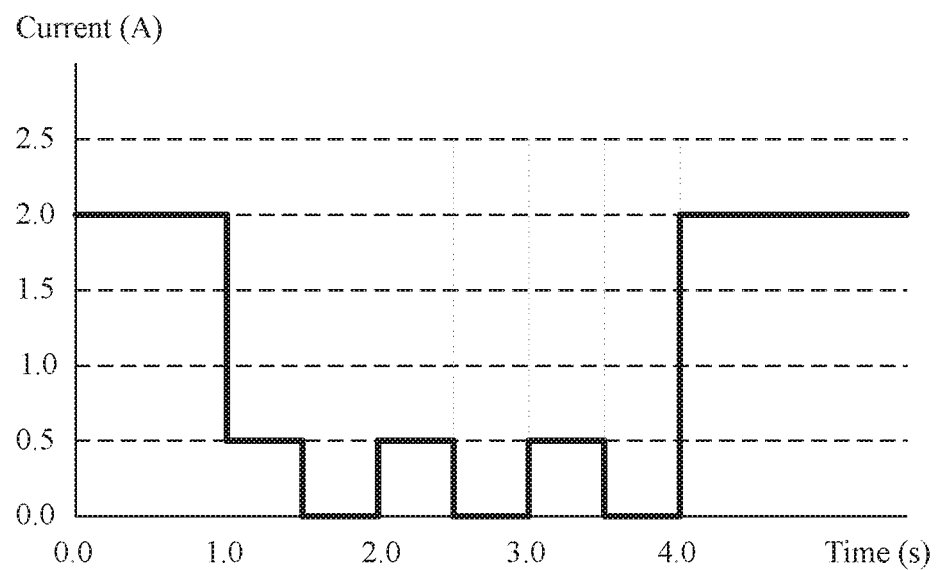
FIG. 3 is a schematic diagram of a current change according to an embodiment of this application.

For example, referring to a schematic diagram of a current change shown in FIG. 3, it is assumed that the charger has a standard configuration 5V-2A. After the electronic device detects connection of the charger, the charger may charge the electronic device in a normal manner. For example, the electronic device may keep a load of a charging circuit of the electronic device at a specific value, so that the charging current is kept at a specific value (for example, 2 A), and lasts for specific duration (for example, lasts for one second). In this way, from 0 seconds to 1 second, the charging current received by the electronic device is 2 A.

S202. The charger detects a preset change condition of a current output manner.

A manner in which the preset change condition is set is not limited in this embodiment of this application.

In an implementation of the present invention, the preconfigured change condition may be that a load value of the charging circuit of the electronic device is a preset value. In this implementation, for ease of understanding, the foregoing example and FIG. 3 are still referred to. After the charger normally charges the electronic device for 1 second, the electronic device sets, based on the charging circuit of the electronic device, a specific load value or a group of load values according to an agreement. In other words, the electronic device changes the load of the charging circuit, so that the load of the charging circuit reaches a preset value. In this case, the charger may detect a "load change" of the electronic device, so that a value of the charging current changes from a currently-used value to another value, for example, from 2 A to 0.5 A; and then performs step S203.

In another implementation of the present invention, the preconfigured change condition may be a preset moment after the charger and the electronic device form a charge loop. In this implementation, for ease of understanding, the foregoing example and FIG. 3 are still referred to. After the charger and the electronic device form the charge loop by using the charge interfaces VBUS and GND, the charger starts timing; and after preset duration elapses, for example, after 1 second elapses, performs the following step S203.

S203. After detecting the preset change condition of the current output manner, the charger outputs a charging current based on a preset current sequence with variable amplitude values, so that the electronic device quantifies the current sequence into a binary sequence; determines whether the quantified binary sequence is the same as a prestored binary sequence; and determines, based on a result of determining, whether the charger is a standard configuration charger of the electronic device.

The preset change condition is detected based on step S203. To be specific, after the charger detects the load change of the electronic device or finds, through monitoring, that charging timing is reached, the charger may output the charging current based on the preset current sequence with variable amplitude values. For example, the charger performs a series of actions such as outputting the current and cutting off the current. In this way, the current sequence with varying amplitude values is formed at the VBUS interface interface that is connected to the charger.

In an implementation of the present invention, the electronic device may output an instruction signal at a moment. The instruction signal is used to instruct the charger to output a charging current based on the preset amplitude values that are the sequence of variable current. If the preconfigured change condition is that the load value of the charging circuit of the electronic device is the preset value, the outputting an instruction signal may include adjusting the load value of the charging circuit to the preset value.

For ease of understanding, still referring to the foregoing example and FIG. 3, it is assumed that a binary sequence that is output from the charger and that corresponds to the current sequence with variable amplitude values is 101010. The charger may output the charging current in the following manner:

outputting a current of 0.5 A for duration of 0.5 s, and then self-locking for 0.5 s;

then outputting a current of 0.5 A for duration of 0.5 s, and then self locking for 0.5 s; and then outputting a current of 0.5 A for duration of 0.5 s, and then self-locking for 0.5 s; and finally, restoring, by the electronic device, a load of the electronic device, so that the charging current output from the charger is restored to the normal charging current of 2 A.

The self-locking, for 0.5 s means to output a current of 0 A for duration of 0.5 s.

In this way, within the duration from is to 4 s, a current pulse sequence is automatically output from the VBUS interface connected to the charger.

It should be noted that current sequences output from different types of chargers may correspond to different binary sequences. Binary codes may correspond to different current values and different duration. For codes 1 and 0 of a binary sequence, the code 1 may correspond to any current value less than a value of a standard configuration current, and the code 0 may correspond to a current 0 or may correspond to any current value less than the current Value corresponding to the code 1, provided that the current corresponding to the code 0 is different from the current corresponding to the code 1. Certainly, to ensure compatibility between chargers, chargers of a same brand or chargers configured for a same series of electronic devices may use a same current sequence output manner. The foregoing content is not limited in this embodiment of this application.

S204. The electronic device detects the charging current output from the charger.

Specifically, the electronic device may detect, by using the VBUS interface connected to the charger, the charging current output from the charger.

S205. When amplitude values of the charging current are a sequence of variable current, quantify the current sequence into a binary sequence.

S206. Determine whether the quantified binary sequence is the same as a prestored binary sequence, and if the quantified binary sequence is the same as the prestored binary sequence, perform step S207; or if the quantified binary sequence is the different from the prestored binary sequence, perform step S208.

In this embodiment, the electronic device prestores a binary sequence corresponding to a current sequence that should be output from the standard configuration charger. When detecting whether the currently-used charger is the standard configuration charger, the electronic device determines, through comparison, whether a binary sequence corresponding to the current sequence output from the VBUS interface connected to the currently-used charger is consistent with the binary sequence corresponding to the current sequence that should be output from the standard configuration charger. For ease of understanding, the foregoing example and FIG. 3 are still referred to. After the electronic device detects the current sequence with variable amplitude values, and quantifies the current sequence into the binary sequence of 101010, the electronic device compares 101010 with the prestored binary sequence corresponding to the standard configuration charger. If the binary sequence stored in the electronic device is also 101010, it is considered that the currently-used charger is the standard configuration charger of the electronic device; or if the binary sequence stored in the electronic device is another binary sequence different from 101010, it is considered that the currently-used charger is a non-standard configuration charger of the electronic device.

S207. The electronic device outputs prompt information indicating that the charger is a standard configuration charger.

S208. The electronic device outputs prompt information indicating that the charger is a non-standard configuration charger.

In this embodiment, after it is determined that the currently-used charger is the standard configuration charger or the non-standard configuration charger, a user may be further prompted. It should be noted that a manner in which the prompt information is output is not limited in this embodiment. The prompt information may be a text prompt, a voice prompt, a combination of a text prompt and an alert tone, or the like.

Further, this embodiment of this application may further include: when the prompt information is output from the electronic device, receiving the charging current output from the charger. Certainly, to ensure charging security and a service life of the electronic device, the electronic device may also forbid from receiving the charging current output from the charger.

Specifically, if the non-standard configuration charger is currently used for the electronic device, the user may be prompted by using the electronic device, for example, prompted by using the following information:

"You are not using a standard configuration charger, please use a standard configuration charger for charging."

Further, if the charger is identified as the non-standard configuration charger, in addition to outputting the prompt information, the electronic device may further forbid the non-standard configuration charger from charging the electronic device. Alternatively, if the charging is not affected, the electronic device may allow the non-standard configuration charger to charge the electronic device, record this abnormal charging behavior in the electronic device to count a quantity of times for which the user uses the non-standard configuration charger, and after the quantity reaches a specified quantity of times, prompt the user to reduce use of the non-standard configuration charger, to ensure a service life of the charger and a service life of the electronic device.

This embodiment of this application provides the method for identifying a charger. After the electronic device and the charger form the charge loop, the electronic device detects the charging current output from the charger; when the amplitude values of the charging current are the sequence of variable current, quantifies the current sequence into the binary sequence; determines whether the quantified binary sequence is the same as the prestored binary sequence; and when the quantified binary sequence is different from the prestored binary sequence, outputs the prompt information indicating that the charger is the non-standard configuration charger. In this application, the currently-used charger only needs to output a current based on a preset current sequence with variable amplitude values. Provided that the binary sequence corresponding to the current sequence is the same as the binary sequence that corresponds to the standard configuration charger and that is stored in the electronic device, it may be considered that the currently-used charger is the standard configuration charger of the electronic device; otherwise, the currently-used charger is the non-standard configuration charger. It can be learned that this application is used to determine whether the currently-used charger is the standard configuration charger. This manner is simple and convenient. In addition, no specific device detection module needs to be disposed on the charger.

Figure 4:
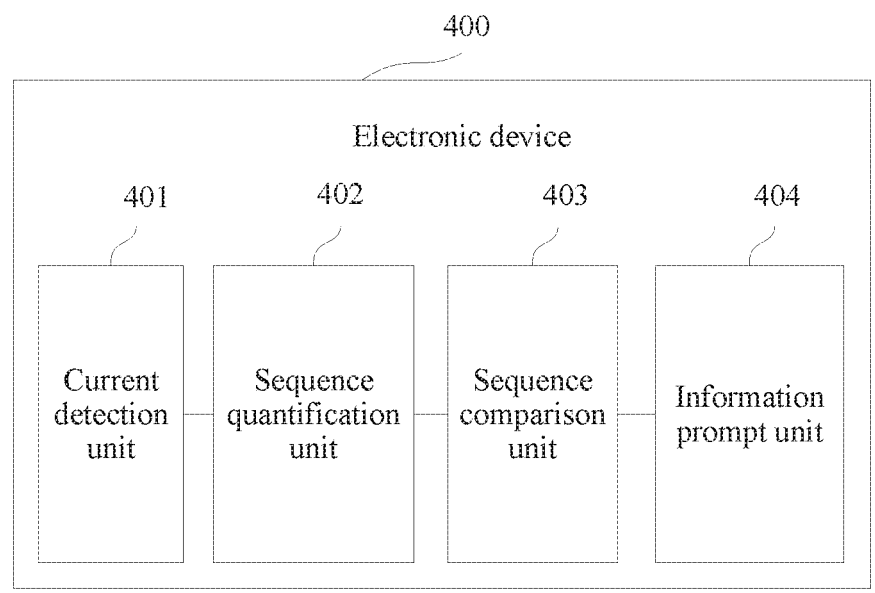
FIG. 4 is a schematic structural diagram of an electronic device according to an embodiment of this application.

FIG. 4 is a schematic structural diagram of an electronic device according to an embodiment of this application. The electronic device 400 includes a current detection unit 401, a sequence quantification unit 402, a sequence comparison unit 403, and an information prompt unit 404.

The current detection unit 401 is configured to detect a charging current output from a charger.

The sequence quantification unit 402 is configured to: when amplitude values of the charging current are a sequence of variable current, quantify the current sequence into a binary sequence.

The sequence comparison unit 403 is configured to determine whether the quantified binary sequence is the same as a prestored binary sequence.

The information prompt unit 404 is configured to: when the quantified binary sequence is different from the prestored binary sequence, output prompt information indicating that the charger is a non-standard configuration charger.

In an implementation of the present invention, the electronic device 400 further includes:

a signal output unit 405, configured to output an instruction signal, where the instruction signal is used to instruct the charger to output a charging current based on preset amplitude values that are a sequence of variable current.

In an implementation of the present invention, the signal output unit 405 is specifically configured to adjust a load value of a charging circuit to a preset value.

In an implementation of the present invention, the electronic device 400 further includes:

a current receiving unit 406, configured to: when the prompt information is output, receive the charging current output from the charger.

In an implementation of the present invention, the current detection unit 401 is specifically configured to detect, by using a VBUS interface connected to the charger, the charging current output from the charger.

For feature descriptions in this embodiment corresponding to FIG. 4, refer to related descriptions of the embodiment corresponding to FIG. 2. Details are not described herein again.

Figure 5:
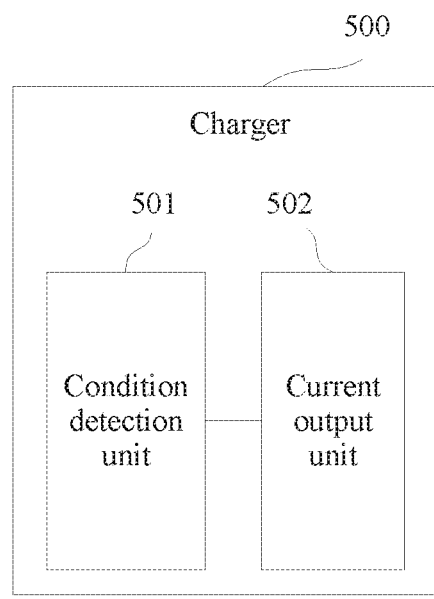
FIG. 5 is a schematic structural diagram of a charger according to an embodiment of this application.

FIG. 5 is a schematic structural diagram of a charger according to an embodiment of this application. The charger 500 includes a condition detection unit 501 and a current output unit 502.

The condition detection unit 501 is configured to detect a preset change condition of a current output manner.

The current output unit 502 is configured to: output a charging current based on a preset current sequence with variable amplitude values, so that the electronic device quantifies the current sequence into a binary sequence determine whether the quantified binary sequence is the same as a prestored binary sequence; and determine, based on a result of determining, whether the charger is a standard configuration charger of the electronic device.

In an implementation of the present invention, the preconfigured change condition may be:

a load value of a charging circuit of the electronic device is a preset value; or a preset moment after the charger and the electronic device form a charge loop.

In some implementations, a pulse-width modulation integrated circuit (Pulse-Width Modulation integrated circuit, PWM IC for short) may be used as a control chip of a charger, to control output performance of the charger, including locking output, controlling (or detecting) and stabilizing an output voltage and a current of the charger, and the like.

For feature descriptions in this embodiment corresponding to FIG. 5, refer to related descriptions of the embodiment corresponding to FIG. 2. Details are not described herein again.

Figure 6:
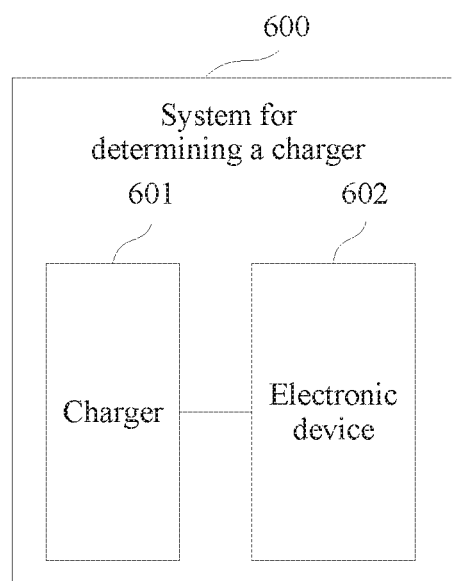
FIG. 6 is a structural diagram of a composition of a system for determining a charger according to an embodiment of this application.

FIG. 6 is a structural diagram of a composition of a system for determining a charger according to an embodiment of this application. The system 600 for identifying a charger includes a charger 601 and an electronic device 602.

The charger 601 is configured to: detect a preset change condition of a current output manner; output a charging current based on a preset current sequence with variable amplitude values, so that the electronic device 602 quantifies the current sequence into a binary sequence; determine whether the quantified binary sequence is the same as a prestored binary sequence; and determine, based on a result of determining, whether the charger 601 is a standard configuration charger of the electronic device 602.

The electronic device 602 is configured to detect the charging current output from the charger 601; when amplitude values of the charging current are a sequence of variable current, quantify the current sequence into a binary sequence; determine whether the quantified binary sequence is the same as a prestored binary sequence; and when the quantified binary sequence is different from the prestored binary sequence, output prompt information indicating that the charger 601 is a non-standard configuration charger.

For feature descriptions in this embodiment corresponding to FIG. 6, refer to related descriptions of the embodiments corresponding to FIG. 4 and FIG. 5. Details are not described herein again.

Figure 7:
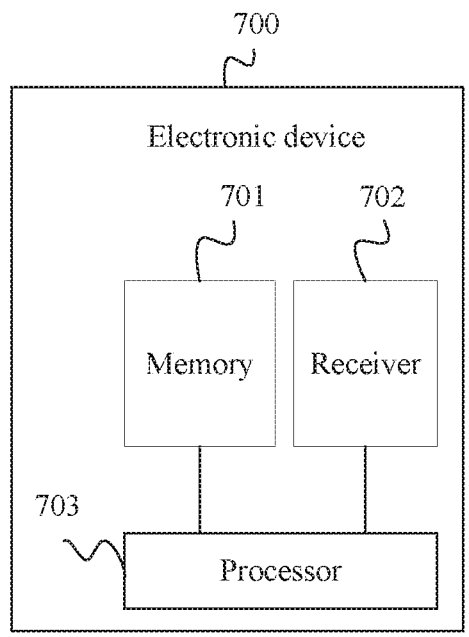
FIG. 7 is a schematic structural diagram of hardware of an electronic device according to an embodiment of this application.

FIG. 7 is a schematic structural diagram of hardware of an electronic device according to an embodiment of this application. The electronic device 700 includes a memory 701, a receiver 702, and a processor 703 connected to both the memory 701 and the receiver 702. The memory 701 is configured to store a group of program instructions. The processor 703 is configured to call the program instructions stored in the memory 701 to perform the following operations:

detecting a charging current output from the charger;

when amplitude values of the charging current are a sequence of variable current, quantifying the current sequence into a binary sequence;

determining whether the quantified binary sequence is the same as a prestored binary sequence; and when the quantified binary sequence is different from the prestored binary sequence, outputting prompt information indicating that the charger is a non-standard configuration charger.

In an implementation of the present invention, the processor 703 is further configured to call the program instructions stored in the memory 701 to perform the following operation:

outputting an instruction signal, where the instruction signal is used to instruct the charger to output a charging current based on preset amplitude values that are a sequence of variable current.

In an implementation of the present invention, the processor 703 is specifically configured to call the program instructions stored in the memory 701 to perform the following operation:

adjusting a load value of a charging circuit to a preset value.

In an implementation of the present invention, the processor 703 is further configured to call the program instructions stored in the memory 701 to perform the following operation:

when the prompt information is output, receiving the charging current output from the charger.

In some implementations, the processor 703 may be a central processing unit (Central Processing Unit, CPU). The memory 701 may be an internal memory in a random access memory (Random Access Memory, RAM) type. The receiver 702 may include a common physical interface, and the physical interface may be an Ethernet (Ethernet) interface or an asynchronous transfer mode (Asynchronous Transfer Mode, ATM) interface. The processor 703, the receiver 702, and the memory 701 may be integrated into one or more independent circuits or hardware, for example, an application-specific integrated circuit (Application-Specific Integrated Circuit, ASIC).

Figure 8:
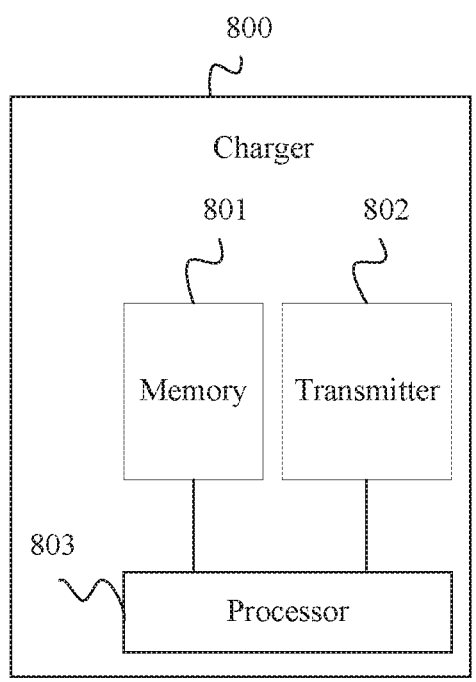
FIG. 8 is a schematic structural diagram of hardware of a charger according to an embodiment of this application.

FIG. 8 is a schematic structural diagram of hardware of a charger according to an embodiment of this application. The charger 800 includes a memory 801, a transmitter 802, and a processor 803 connected to both the memory 801 and the transmitter 802. The memory 801 is configured to store a group of program instructions. The processor 803 is configured to call the program instructions stored in the memory 801 to perform the following operations:

detecting a preset change condition of a current output manner; and outputting a charging current based on a preset current sequence with variable amplitude values, so that the electronic device quantifies the current sequence into a binary sequence; determining whether the quantified binary sequence is the same as a prestored binary sequence; and determining, based on a result of determining, whether the charger is a standard configuration charger of the electronic device.

In an implementation of the present invention, the preconfigured change condition is:

a load value of a charging circuit of the electronic device is a preset value; or a preset moment after the charger and the electronic device form a charge loop.

In some implementations, the processor 803 may be a CPU. The memory 801 may be an internal memory in a RAM type. The transmitter 802 may include a common physical interface, and the physical interface may be an Ethernet interface or an ATM interface. The processor 803, the transmitter 802, and the memory 801 may be integrated into one or more independent circuits or hardware, for example, an ASIC.

It may be clearly understood by persons skilled in the art that, for ease of convenience and brevity, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division or may be other division in actual implementation. For example, a plurality of units or components may be combined or integrated into another system, or some features may be ignored or not be performed. In addition, the displayed or discussed mutual couplings or direct couplings or communication connections may be implemented in indirect couplings or communication connections through some interfaces, apparatuses, or units, and may be in electrical, mechanical, or other forms.

The units described as separate parts may or may not be physically separate, and parts displayed as units may or may not be physical units, and may be located in one position or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for determining a charger, applied to an electronic device, comprising:
   detecting a charging current output from the charger, wherein the charging current comprises a variable amplitude current sequence;
   quantifying the variable amplitude current sequence into a binary number sequence;
   determining whether the binary number sequence is the same as a prestored binary number sequence; and
   outputting prompt information indicating that the charger is a non-standard configuration charger when the binary number sequence is different from the prestored binary number sequence.

2. The method of claim 1, further comprising outputting an instruction signal, wherein the instruction signal instructs the charger to output a second charging current based on preset amplitude values that comprises a second variable amplitude current sequence.

3. The method of claim 2, wherein outputting the instruction signal comprises adjusting a load value of a charging circuit to a preset value.

4. The method of claim 3, further comprising receiving the charging current output from the charger when the prompt information is output.

5. The method of claim 2, further comprising receiving the charging current output from the charger when the prompt information is output.

6. The method of claim 1, further comprising receiving the charging current output from the charger when the prompt information is output.

7. The method of claim 1, wherein the charging current comprises a current outputting duration and a self-locking duration.

8. The method of claim 1, wherein the prestored binary number sequence comprises a first code and a second code, wherein the first code corresponds to a current value, and wherein the second code corresponds to any current value less than the current value.

9. The method of claim 1, wherein the prompt information comprises a textual message indicating that the non-standard configuration charger is being used.

10. The method of claim 1, wherein the electronic device is coupled to the charger through a voltage bus (VBUS) interface and a ground (GND) interface.

11. The method of claim 1, wherein the electronic device comprises a mobile phone, and wherein the charger comprises a 5 volt and 2 ampere (A) charger.

12. A method for identifying a charger, applied to the charger, comprising:
    detecting a preset change condition of a current output manner;
    outputting a charging current comprising a variable amplitude current sequence;
    determining whether a binary number sequence corresponding to the variable amplitude current sequence is the same as a prestored binary number sequence; and
    determining that the charger is a standard configuration charger of an electronic device when the binary number sequence is the same as the prestored binary number sequence.

13. The method of claim 12, wherein the preset change condition comprises a load value of a charging circuit of the electronic device being a preset value.

14. The method of claim 12, wherein the preset change condition comprises a preset moment after the charger and the electronic device form a charge loop.

15. An electronic device, comprising:
    a processor; and
    a memory coupled to the processor using a system bus, wherein the memory is configured to store one or more programs, wherein the one or more programs comprise an instruction, and wherein the electronic device is configured to execute the instruction to:
       detect a charging current output from a charger, wherein the charging current comprises a variable amplitude current sequence;
       quantify the variable amplitude current sequence into a binary number sequence;
       determine whether the binary number sequence is the same as a prestored binary number sequence; and
       output prompt information indicating that the charger is a non-standard configuration charger when the binary number sequence is different from the prestored binary number sequence.

16. The electronic device of claim 15, wherein the electronic device is further configured to execute the instruction to output an instruction signal, wherein the instruction signal instructs the charger to output a second charging current based on preset amplitude values that comprises a second variable amplitude current sequence.

17. The electronic device of claim 16, wherein the electronic device is further configured to execute the instruction to output the instruction signal by adjusting a load value of a charging circuit to a preset value.

18. The electronic device of claim 17, wherein the electronic device is further configured to execute the instruction to receive the charging current output from the charger when the prompt information is output.

19. The electronic device of claim 16, wherein the electronic device is further configured to execute the instruction to receive the charging current output from the charger when the prompt information is output.

20. The electronic device according to claim 15, wherein the electronic device is further configured to execute the instruction to receive the charging current output from the charger when the prompt information is output.

\* \* \* \* \*

UNITED STATES PATENT AND TRADEMARK OFFICE
CERTIFICATE OF CORRECTION

| | |
|---|---|
| PATENT NO. | : 11,264,822 B2 |
| APPLICATION NO. | : 16/464412 |
| DATED | : March 1, 2022 |
| INVENTOR(S) | : Jinming Wu, Peng Ding and Yajun Pan |

It is certified that error appears in the above-identified patent and that said Letters Patent is hereby corrected as shown below:

On the Title Page

Page 2, item (56) References Cited, Line 24: "TW I42358 B 10/2005" should read "TW I242358 B 10/2005"

Signed and Sealed this
Seventeenth Day of May, 2022

Katherine Kelly Vidal
*Director of the United States Patent and Trademark Office*